US009911430B2

(12) United States Patent
Schroeter et al.

(10) Patent No.: US 9,911,430 B2
(45) Date of Patent: *Mar. 6, 2018

(54) ACOUSTIC ENVIRONMENT RECOGNIZER FOR OPTIMAL SPEECH PROCESSING

(71) Applicant: AT&T Intellectual Property I, L.P., Atlanta, GA (US)

(72) Inventors: Horst J. Schroeter, New Providence, NJ (US); Donald J. Bowen, Madison, NJ (US); Dimitrios B. Dimitriadis, Rutherford, NJ (US); Lusheng Ji, Randolph, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/362,372

(22) Filed: Nov. 28, 2016

(65) Prior Publication Data

US 2017/0076736 A1    Mar. 16, 2017

Related U.S. Application Data

(63) Continuation of application No. 14/530,066, filed on Oct. 31, 2014, now Pat. No. 9,530,408.

(51) Int. Cl.
*G10L 21/02* (2013.01)
*G10L 21/028* (2013.01)
(Continued)

(52) U.S. Cl.
CPC ............ *G10L 21/028* (2013.01); *G10L 15/20* (2013.01); *G10L 21/0208* (2013.01); *G10L 21/0216* (2013.01); *G10L 25/72* (2013.01)

(58) Field of Classification Search
CPC ..... G10L 21/0208; G10L 15/20; G10L 15/22; G10L 15/00; G10L 15/063; G10L 15/065
(Continued)

(56) References Cited

U.S. PATENT DOCUMENTS 5,970,446 A  10/1999  Goldberg et al.
6,035,048 A   3/2000  Diethorn
(Continued)

FOREIGN PATENT DOCUMENTS

WO   2014003748   1/2014

OTHER PUBLICATIONS

Chang et al., "CSR: A Cloud-Assisted Speech Recognition Service for Personal Mobile Device," International Conference on Parallel Processing (ICPP), Sep. 13-16, 2011, Taipei City, p. 305-314. http://ieeexplore.ieee.org/xpl/articleDetailsjsp?tp=&arnumber=6047199.
(Continued)

*Primary Examiner* — Jakieda Jackson
(74) *Attorney, Agent, or Firm* — Akerman LLP; Michael K. Dixon; Mammen (Roy) P. Zachariah, Jr.

(57) ABSTRACT

A system for providing an acoustic environment recognizer for optimal speech processing is disclosed. In particular, the system may utilize metadata obtained from various acoustic environments to assist in suppressing ambient noise interfering with a desired audio signal. In order to do so, the system may receive an audio stream including an audio signal associated with a user and including ambient noise obtained from an acoustic environment of the user. The system may obtain first metadata associated with the ambient noise, and may determine if the first metadata corresponds to second metadata in a profile for the acoustic environment. If the first metadata corresponds to the second metadata, the system may select a processing scheme for suppressing the ambient noise from the audio stream, and process the audio stream using the processing scheme. Once the audio stream is processed, the system may provide the audio stream to a destination.

20 Claims, 4 Drawing Sheets

(51) Int. Cl.
  *G10L 15/20* (2006.01)
  *G10L 21/0208* (2013.01)
  *G10L 21/0216* (2013.01)
  *G10L 25/72* (2013.01)
(58) Field of Classification Search
  USPC .................................................. 704/233, 226
  See application file for complete search history.

(56) References Cited

U.S. PATENT DOCUMENTS

| | | |
|---|---|---|
| 6,195,651 B1 | 2/2001 | Handel et al. |
| 6,502,067 B1 | 12/2002 | Hegger et al. |
| 6,633,846 B1 | 10/2003 | Bennett et al. |
| 6,785,648 B2 | 8/2004 | Menendez-pidal et al. |
| 7,072,834 B2 | 7/2006 | Zhou |
| 7,209,881 B2 | 4/2007 | Yoshizawa et al. |
| 7,451,085 B2 | 11/2008 | Rose et al. |
| 8,140,327 B2 | 3/2012 | Kennewick et al. |
| 8,265,928 B2 | 9/2012 | Kristjansson et al. |
| 8,296,138 B2 | 10/2012 | Parthasarathy et al. |
| 8,326,634 B2 | 12/2012 | Di et al. |
| 8,498,627 B2 | 7/2013 | Rodriguez |
| 8,600,741 B2 | 12/2013 | Talwar et al. |
| 8,600,743 B2 | 12/2013 | Lindahl et al. |
| 8,635,243 B2 | 1/2014 | Phillips et al. |
| 8,639,516 B2 | 1/2014 | Lindahl et al. |
| 8,645,132 B2 | 2/2014 | Mozer et al. |
| 9,197,974 B1 | 11/2015 | Clark et al. |
| 2002/0173955 A1 | 11/2002 | Reich |
| 2003/0033143 A1 | 2/2003 | Aronowitz |
| 2003/0189603 A1 | 10/2003 | Goyal et al. |
| 2003/0220797 A1 | 11/2003 | Ito |
| 2004/0020700 A1 | 2/2004 | Watson et al. |
| 2004/0199388 A1 | 10/2004 | Armbruster et al. |
| 2005/0049854 A1 | 3/2005 | Reding et al. |
| 2005/0171775 A1 | 8/2005 | Doyle |
| 2005/0177376 A1 | 8/2005 | Cooper et al. |
| 2006/0074651 A1 | 4/2006 | Arun |
| 2006/0282264 A1 | 12/2006 | Denny et al. |
| 2007/0276651 A1 | 11/2007 | Bliss et al. |
| 2008/0147411 A1 | 6/2008 | Dames et al. |
| 2011/0120222 A1 | 5/2011 | Scholte et al. |
| 2011/0161076 A1 | 6/2011 | Davis et al. |
| 2011/0218952 A1 | 9/2011 | Mitchell et al. |
| 2013/0085753 A1 | 4/2013 | Bringert et al. |
| 2013/0096915 A1 | 4/2013 | Rennie et al. |
| 2013/0144618 A1 | 6/2013 | Sun et al. |
| 2013/0211828 A1 | 8/2013 | Gratke et al. |
| 2013/0297313 A1 | 11/2013 | Lloyd et al. |
| 2014/0278389 A1 | 9/2014 | Zurek et al. |
| 2015/0081287 A1 | 3/2015 | Elfenbein et al. |
| 2015/0194151 A1 | 7/2015 | Jeyachandran et al. |
| 2015/0269954 A1 | 9/2015 | Ryan et al. |
| 2016/0019904 A1 | 1/2016 | Charette et al. |
| 2016/0057490 A1 | 2/2016 | Besehanic |

OTHER PUBLICATIONS

Akbacak et al., "Environmental Sniffing: Noise Knowledge Estimation for Robust Speech Systems," IEEE Transactions on Audio, Speech, and Language Processing (Feb. 2007) 15(2):465-477. http://ieeexploreieee.org/xpl/articleDetailsjsp?tp=&arnumber=4067018.

Hurmalainen et al., "Modelling non-stationary noise with spectral factorisation in automatic speech recognition," Computer Speech & Language (May 2013) 27(3):763-779. http://www.sciencedirect.com/science/article/pii/S0885230812000563.

Cooke et al., "Robust automatic speech recognition with missing and unreliable acoustic data," Speech Communication (Jun. 2001) 34(3):267-285. http://www.sciencedirect.com/science/article/pii/S0167639300000340.

Bocchieri et al., "Use of geographical meta-data in ASR language and acoustic models," 2010 IEEE International Conference on Acoustics Speech and Signal Processing (ICASSP), Mar. 14-19, 2010, pp. 5118-5121. http://ieeexplore.ieee.org/xpl/articleDetails.jsp?tp=&arnumber=5495026.

Riccardi et al., "Active learning: theory and applications to automatic speech recognition," IEEE Transactions on Speech and Audio Processing (Jul. 2005) 13(4):504-511. http://ieeexplore.ieee.org/xpl/articleDetails.jsp?tp=&arnumber=1453593.

Bacchiani et al., "Meta-data conditional language modeling," IEEE International Conference on Acoustics, Speech, and Signal Processing (ICASSP -04), May 17-21, 2004, p. 241-244. http://ieeexplore.ieee.org/xpl/articleDetails.jsp?tp=&arnumber=1325967.

Li et al., "An Overview of Noise-Robust Automatic Speech Recognition," IEEE/ACM Transactions on Audio, Speech, and Language Processing (Apr. 2014) 22(4):745-777. http://ieeexplore.ieee.org/xpl/articleDetails.jsp?tp=&arnumber=6732927.

Rose et al., "On the implementation of ASR algorithms for hand-held wireless mobile devices," IEEE International Conference on Acoustics, Speech, and Signal Processing (ICASSP -01), May 7-11, 2001, p. I:17-20. http://ieeexplore.ieee.org/xpl/articleDetails.jsp?tp=&arnumber=940756.

Husniak et al., "Possibilities of Using Speech Recognition Systems of Smart Terminal Devices in Traffic Environment," Procedia Engineering (2014) 69:778-787. http://www.sciencedirect.com/science/article/pii/S1877705814003002.

ACOUSTIC ENVIRONMENT RECOGNIZER FOR OPTIMAL SPEECH PROCESSING

CROSS-REFERENCES TO RELATED APPLICATIONS

This application is a continuation of and claims priority to U.S. patent application Ser. No. 14/530,066, filed Oct. 31, 2014, which is hereby incorporated by reference in its entirety.

FIELD OF THE INVENTION

The present application relates to technologies for noise suppression, speech processing, and an environment recognition, and more particularly, to a system and method for providing an acoustic environment recognizer for optimal speech processing.

BACKGROUND

Currently, end users regularly utilize smartphones, voice over internet protocol (VoIP) applications, and other audio-based technologies to place and receive phone calls, access various types of services and content, perform a variety of functions, or a combination thereof. As the importance and prevalence of mobile communications has increased, end users have become increasingly likely to utilize mobile communications devices and voice-based applications in environments that include significant amounts of ambient noise that may potentially interfere with the end users' communications. In particular, such ambient noise may interfere with the perceptibility and quality of communications held between end users, communications intended for automatic speech recognition systems, communications intended for various voice-based applications, other types of communications, or any combination thereof.

Traditionally, adaptive filtering has been utilized to filter ambient noise obtained by one or more microphone sensors positioned in a home, car, or other similar location. While adaptive filtering assists in providing noise suppression for various types of audio communications, adaptive filtering requires a noticeable amount of adaptation time for a speech enhancement system to determine what the actual type of acoustic environment based on its acoustic parameters. Additionally, during the adaptation time, any speech or noise enhancement that can be provided during the adaptation period is minimal, if any. Furthermore, studies have shown that more than half of all commands entered into various automatic speech recognition systems are very short. As a result, the adaptation time required in existing speech enhancement systems does not allow for the enhancement of the audio associated with the first few commands or words spoken into an automatic speech recognition system. Moreover, traditional solutions typically involve brute-force processing, in isolation, of all of the various audio information occurring in the environment. Such brute-force processing often requires extensive use of limited network resources, causes communication delays, increases power usage, and increases network and other costs.

SUMMARY

A system and accompanying methods for providing an acoustic environment recognizer for optimal speech processing are disclosed. In particular, the system and methods may enhance audio streams by utilizing metadata, profiles, and other information associated with an acoustic environment, in conjunction with noise suppression algorithms and techniques, to suppress ambient or other noise that may potentially interfere with a user's communications. In order to accomplish this, the system and methods may involve receiving an audio stream that includes an audio signal associated with a user and ambient noise from an acoustic environment in which the user is located. As the audio stream is being received or at another selected time, the system and methods may include obtaining metadata, sensor data, and other data associated with the ambient noise by utilizing sensors or other devices. Once the metadata, sensor data, and other data associated with the ambient noise are obtained, the system and methods may include utilizing an acoustic environment recognizer to recognize and verify the acoustic environment based on a comparison with one or more previously created profiles associated with the acoustic environment. If the acoustic environment is not recognized based on the previously created profiles, the acoustic environment may be a new acoustic environment, and the metadata, sensor data, and other data may be stored in a profile created for the new acoustic environment.

Based on the metadata, the sensor data, the profiles, other information, or a combination thereof, the system and methods may include selecting an optimal processing scheme for suppressing the ambient noise from the audio stream. The system and methods may then include processing the audio stream based on the processing scheme to suppress the ambient noise from the audio stream and to also enhance the audio stream. Once the ambient noise is suppressed from the audio stream, the audio stream is enhanced, or a combination thereof, the audio stream may be provided to an intended destination. For example, the enhanced audio stream may be transmitted to an automatic speech recognition process for further processing or to another user that is communicating with the user. Thus, the system and methods may harvest and leverage metadata, profiles, and other information associated with an acoustic environment to suppress ambient noise potentially interfering with audio communications and to enhance desired audio communications.

In one embodiment, a system for providing an acoustic environment recognizer for optimal speech processing is disclosed. The system may include a memory that stores instructions and a processor that executes the instructions to perform various operations of the system. The system may perform an operation that includes receiving an audio stream including an audio signal associated with a user and including ambient noise obtained from an acoustic environment in which the user is located. The system may then perform operations that include obtaining first metadata associated with the ambient noise in the acoustic environment, and determining if the first metadata associated with the ambient noise corresponds to second metadata in a profile for the acoustic environment. If the first metadata is determined by the system to correspond to the second metadata, the system may perform an operation that includes selecting, based on the profile, a processing scheme for suppressing the ambient noise from the audio stream. The system may then perform an operation that includes processing the audio stream using the processing scheme in order to suppress the ambient noise in the audio stream. Finally, the system may perform an operation that includes providing the audio stream to a destination after the audio stream is processing using the processing scheme.

In another embodiment, a method for providing an acoustic environment recognizer for optimal speech processing is disclosed. The method may include utilizing a memory that stores instructions, and a processor that executes the instructions to perform the various functions of the method. The method may include receiving an audio stream including an audio signal associated with a user and including ambient noise obtained from an acoustic environment in which the user is located. The method may also include obtaining first metadata associated with the ambient noise in the acoustic environment, and determining if the first metadata associated with the ambient noise corresponds to second metadata in a profile for the acoustic environment. If the first metadata is determined to correspond to the second metadata, the method may include selecting, based on the profile, a processing scheme for suppressing the ambient noise from the audio stream. Once the processing scheme is selected, the method may include processing the audio stream using the processing scheme in order to suppress the ambient noise in the audio stream. After processing the audio stream using the processing scheme, the method may include providing the audio stream to a destination.

According to yet another embodiment, a computer-readable device having instructions for providing an acoustic environment recognizer for optimal speech processing is provided. The computer instructions, which when loaded and executed by a processor, may cause the processor to perform operations including: receiving an audio stream including an audio signal associated with a user and including ambient noise obtained from an acoustic environment in which the user is located; obtaining first metadata associated with the ambient noise in the acoustic environment; determining if the first metadata associated with the ambient noise corresponds to second metadata in a profile for the acoustic environment; selecting, if the first metadata is determined to correspond to the second metadata, a processing scheme for suppressing the ambient noise from the audio stream, wherein the processing scheme is selected based on the profile; processing the audio stream using the processing scheme in order to suppress the ambient noise in the audio stream; and providing, after processing the audio stream using the processing scheme, the audio stream to a destination.

These and other features of the systems and methods for providing an acoustic environment recognizer for optimal speech processing are described in the following detailed description, drawings, and appended claims.

DETAILED DESCRIPTION OF THE INVENTION

Figure 1:
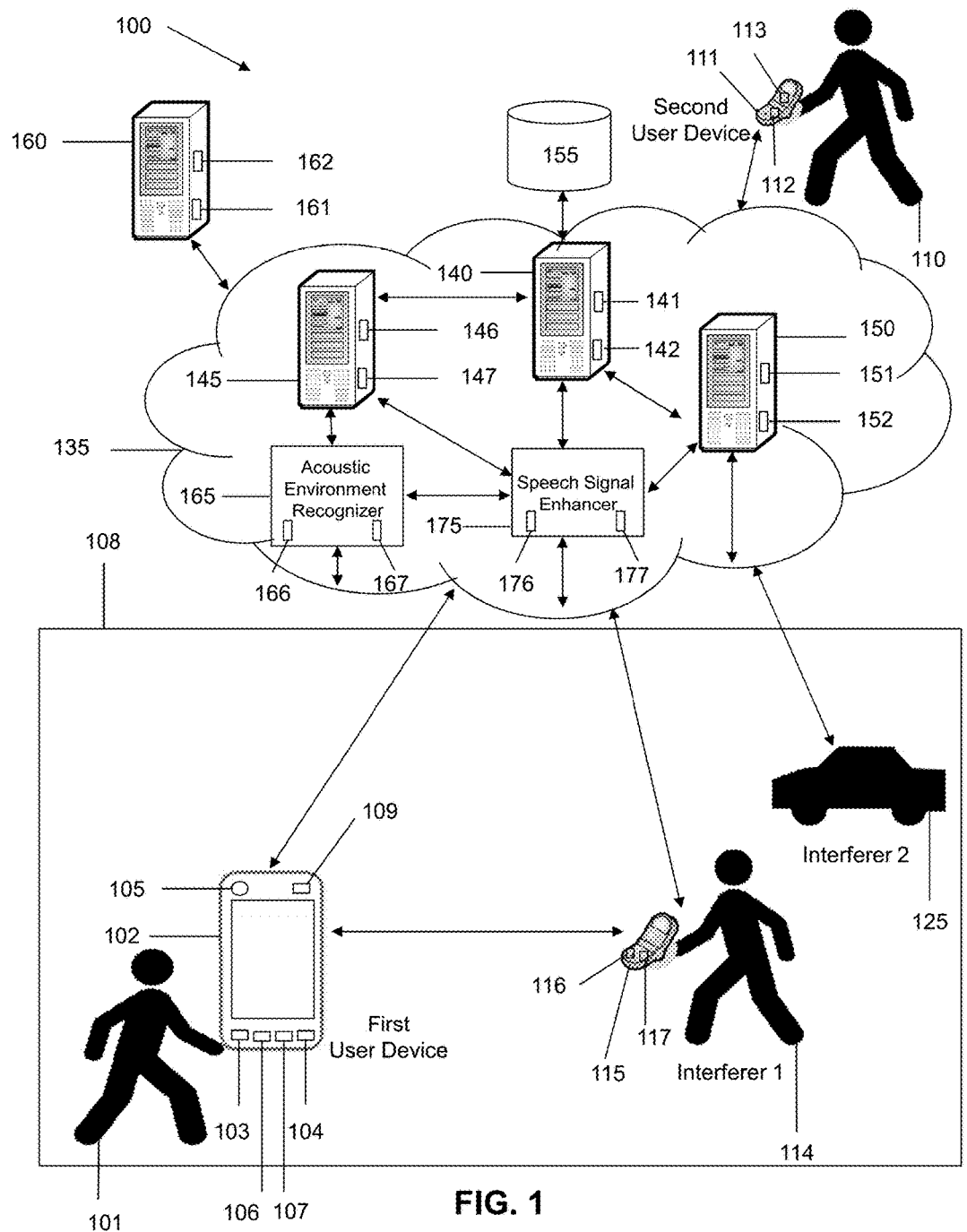
FIG. 1 is a schematic diagram of a system for providing an acoustic environment recognizer for optimal speech processing according to an embodiment of the present disclosure.

A system 100 and accompanying methods for providing an acoustic environment recognizer for optimal speech processing are disclosed, as shown in FIGS. 1-4. In particular, the system 100 and methods may enhance audio streams by utilizing metadata, profiles, and other information associated with an acoustic environment, in conjunction with noise suppression algorithms and techniques, to suppress ambient noise that may potentially interfere with a user's communications. In order to accomplish this, the system 100 and methods may receive and analyze an audio stream including an audio signal associated with a particular user, such as first user 101, and ambient noise from an acoustic environment 108 in which the user is located. As the audio stream is being received or at another selected time, the system 100 and methods may include obtaining metadata, sensor data, and other data associated with the ambient noise by utilizing sensors or other devices. Once the metadata, sensor data, and other data associated with the ambient noise are obtained, the system 100 and methods may include utilizing an acoustic environment recognizer 165 to recognize and verify the acoustic environment 108 based on a comparison with information contained in one or more previously created profiles associated with the acoustic environment 108. If the acoustic environment 108 is not recognized based on the previously created profiles, the acoustic environment 108 may be a new acoustic environment, and the metadata, sensor data, and other data may be stored in a profile created for the new acoustic environment.

Based on the metadata, the sensor data, the profiles, other information, or a combination thereof, the system 100 and methods may include selecting an optimal processing scheme for suppressing the ambient noise from the audio stream. The system 100 and methods may then include processing the audio stream based on the processing scheme so as to suppress the ambient noise from the audio stream and to enhance the audio stream. Once the ambient noise is suppressed from the audio stream and the audio stream is enhanced, the audio stream may be provided to a destination. For example, the enhanced audio stream may be transmitted to an automatic speech recognition process for further processing or to another user that is communicating with the user, such as second user 110. Thus, the system 100 and methods may harvest and leverage metadata, profiles, and other information associated with an acoustic environment to suppress ambient noise potentially interfering with audio communications and to substantially enhance desired audio communications.

As shown in FIG. 1, a system 100 for providing an acoustic environment recognizer 165 for optimal speech processing is disclosed. The system 100 may be configured to support, but is not limited to, supporting, cloud computing services, content delivery services, automatic speech recognition services, telephone services, voice-over-internet protocol services (VoIP), software as a service (SaaS) applications, gaming applications and services, productivity applications and services, mobile applications and services, and any other computing applications and services. The system may include a first user 101 that may utilize first user device 102 to access content, data, and services, to initiate and participate in communications sessions, or to perform a variety of other functions. As an example, the first user 101 may utilize first user device 102 to engage in a communications session, such as a telephone call or a chat session, with a second user 110 that may be utilizing second user device 111.

In certain embodiments, the first user device 102 and second user device 111 may be computers, servers, mobile devices, smartphones, computer tablets, phablets, or any other computing devices. In one embodiment, the first user device 102 may include a memory 103 that includes instructions, and a processor 104 that executes the instructions from the memory 103 to perform various operations that are performed by the first user device 102. The processor 104 may be hardware, software, or a combination thereof. Additionally, the first user device 102 may include a camera 105, which may be utilized to capture video, image, or other content. Furthermore, the first user device 102 may also include an accelerometer 106 that may be utilized to measure a rate of acceleration of the first user device 102, which may be utilized to determine an orientation of the first user device 102, along with gyroscope 109. The gyroscope 109 may also be utilized to determine the extent and rate of rotation of the first user device 102 in space. Furthermore, the first user device 102 may include a global positioning sensor 107 that may provide location information for the first user device 102 and location information for the first user 101 that is using the first user device 102. The second user device 111 may include a memory 112 that includes instructions, and a processor 113 that executes the instructions from the memory 112 to perform various operations that are performed by the second user device 111. The processor 113 may be hardware, software, or a combination thereof.

The first user 101 and the second user 110 may utilize the first user device 102 and second user device 111, respectively, to engage in communications sessions with each other. Additionally, the first user 101 and the second user 110 may utilize the first user device 102 and the second user device 111 to access and obtain various types of content and services, such as, but not limited to, audio content, video content, web content, text content, any type of content, automatic speech recognition services, other speech-related services, or any combination thereof. Additionally, the first and second users 101, 110 may utilize the first and second user devices 102, 111 to perform a variety of other tasks and functions. In certain embodiments, the first user device 102 and second user device 111 may include a software application that may be an automatic speech recognition application, a cloud-based application, gaming application, an internet-based application, a browser application, a mobile application, a productivity application, a video application, a music application, a social media application, a financial application, a news application, any other type of application, or a combination thereof. In certain embodiments, the application may be utilized to provide noise suppression and speech enhancement services for the first and second users 101, 110. In certain embodiments, at least a portion of the software application may be configured to execute directly on the first user device 102 and second user device 111, however, in other embodiments, the software application may be configured to execute on the other devices and components in the system 100.

The first user 101 of the first user device 102 may be located in an acoustic environment 108, which may be any type of environment, such as, but not limited to, a street, a stadium, an airport, a park, an office building, a vehicle, a body of water, a movie theater, or any other type of environment. In certain embodiments, the second user 110 may be located in the same acoustic environment 108 as the first user 101, however, in other embodiments, the second user 110 may be located in a different environment from the first user 101. In FIG. 1, the second user 110 is illustratively shown as not being located in the same acoustic environment 108 as the first user 101. The acoustic environment 108 may include ambient noise generated by one or more interferers, such as, but not limited to, interferers 114, 125. In certain embodiments, the interferers 114, 125 may be any type of object, person, or animal that may make noise in the acoustic environment 108 that may potentially interfere with communications made by the first user 101, the second user 110, or both. Illustratively, in FIG. 1, the interferer 114 is an interfering user that is using an interfering device 115, such as a smartphone, that includes a memory 116 that stores instructions and a processor 117 that executes the instructions to perform the various operations of the interfering device 115. Interferer 125 is illustratively shown in FIG. 1 as a vehicle. In certain embodiments, the acoustic environment 108 may also include noise generated by any other type of noise source as well.

The system 100 may also include an acoustic environment recognizer 165, which may be utilized recognize, identify, and verify the acoustic environment 108. The acoustic environment recognizer 165 may include a memory 166 that includes instructions, and a processor 167 that executes the instructions from the memory 166 to perform various operations that are performed by the acoustic environment recognizer 165. The processor 167 may be hardware, software, or a combination thereof. The acoustic environment recognizer 165 may reside within the communications network 135, however, in other embodiments, the acoustic environment recognizer 165 may be located outside the communications network 135. In certain embodiments, the acoustic environment recognizer 165 may be configured to receive an audio stream directly from any of the devices in the system 100. The audio stream, for example, may include speech from the first user 101 and ambient noise picked up by the microphone of the first user device 102 while the first user 101 is speaking. Once the audio stream is received or at another selected time, the acoustic environment recognizer 165 may obtain metadata, sensor data, other information, and measurements associated with the audio stream and the acoustic environment 108. In certain embodiments, the metadata, sensor data, other information, and measurements may be obtained by utilizing information gathered from the camera 105, the accelerometer 106, the gyroscope 109, and the global positioning sensor 107.

Once the metadata, sensor data, other information, measurements, or any combination thereof, are obtained, the acoustic environment recognizer 165 may compare the obtained data and ambient noise to information contained in a noise profile, a device profile 185 associated with the first user device 102, a user profile 190, or to any other information, to identify, recognize, and verify the acoustic environment 108 that the first user device 102 is located in. A noise profile may include, but is not limited to, audio information, signaling information, noise suppression algorithm information, noise cancellation information, location information, time information, or other information that corresponds to the noise conditions typically found in a particular environment, such as acoustic environment 108. For example, in FIG. 1, if the acoustic environment 108 is a busy street, the corresponding noise profile may include noise cancellation information and acoustic characteristics that may be utilized in identifying and cancelling noises typically occurring on a busy street. The noise profile may also include information that takes into account location dependencies associated with the acoustic environment 108, time dependencies associated with the acoustic environment, or a combination thereof. For example, the noise profile may include real-time location data that can be utilized to adapt the processing of the audio streams based on expected changes in noise scenarios that the first user 101, or any other selected user, experiences. With regard to time dependencies, the noise profile may include noise information for a particular noise as the noise or environment changes over time, as the noise situation itself changes over time, or any combination thereof. Based on the noise information included in the noise profile, the system 100 may determine the usual noise situations that the first user 101 experiences over time so as to enable the selection of processing schemes based on the changes in noise situations.

Figure 2:
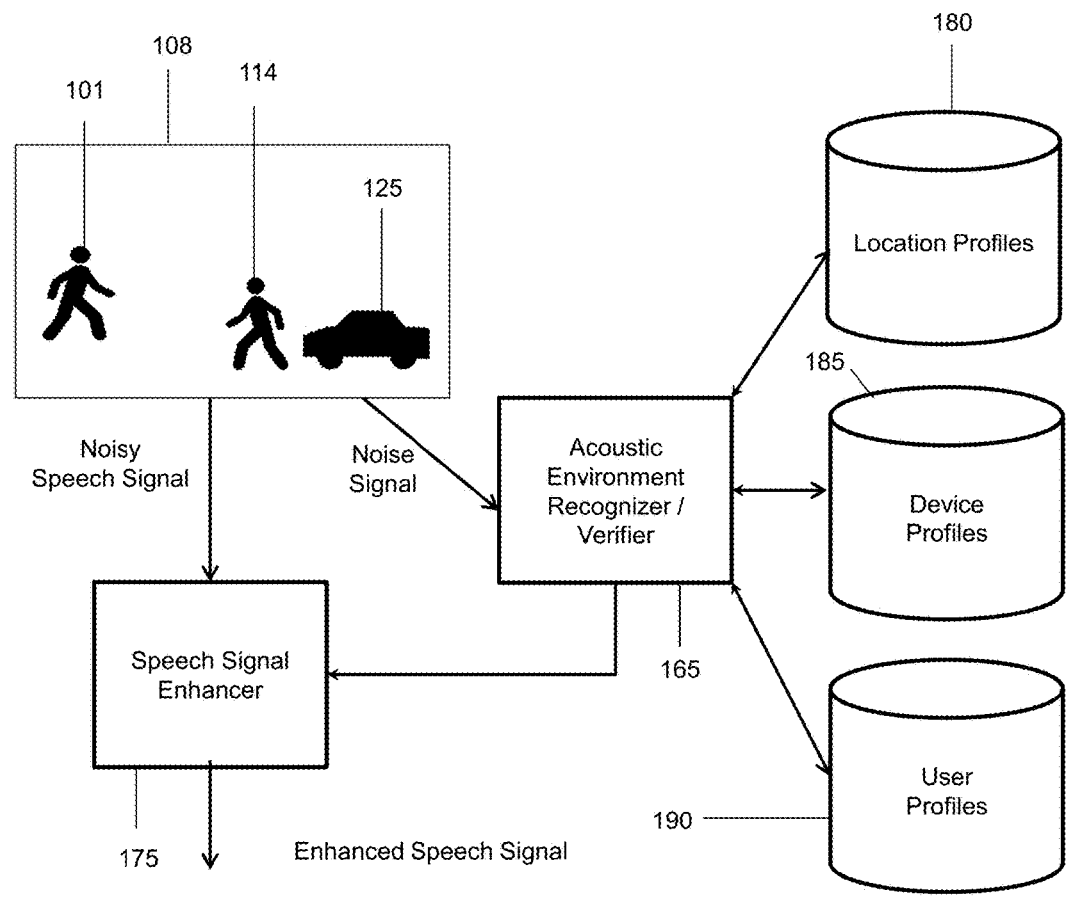
FIG. 2 is a schematic diagram that illustrates how the acoustic environment recognizer and the speech signal enhancer of FIG. 1 suppress noise from audio streams according to an embodiment of the present disclosure.

Additionally, a device profile 185, as shown in FIG. 2, may include information corresponding to the first user device 102, the second user device 111, the interfering devices 115, 125, or any other device in the system 100. Notably, each device in the system 100 may have its own corresponding device profile 185. Information included in the device profile 185 may include, but is not limited to, audio information, signaling information, noise cancellation information, or other information specifically corresponding to the first user device 102, the second user device 111, the interfering devices 115, 125, the noise conditions made by such devices, or any combination thereof. For example, a device profile 185 for first user device 102 may include noise cancellation information and metadata corresponding to audio signals associated with the first user device 102, information identifying the type of device that the first user device 102 is, information for processing audio streams based on the acoustic characteristics of a microphone, a speaker, or other component of the first user device 102, information relating to how the first user 101 uses the first user device 102, any other information associated with the first user device 102, or any combination thereof. Similarly, the interfering device 125, which in this case is a vehicle, may have its own device profile 185, which includes similar types of information as stored for the first user device 102, but which is tailored to the interfering device 125. The interfering device 115 may also have its own profile that is tailored to the unique audio and other characteristics associated with the interfering device 115. The device profiles 185 may also include information on device-specific best practices so as to maximize noise suppression of ambient noise and enhancement of desired audio signals.

A user profile 190 may be a profile corresponding to the first user 101, the second user 110, the interferer 114, or any other user. As an example, the user profile 190 of the first user 101 may include audio information, such as, but not limited to, audio information identifying or otherwise associated with the voice of the first user 101. Additionally, the user profile 190 may include other information associated with the first user 101, such as, but not limited to, a name of the first user 101, the age of the first user 101, demographic information associated with the first user 101, an acoustic dictionary corresponding to the first user 101, an ethnicity of the first user 101, the physical characteristics of the first user 101, a device of the first user 101, and any other information. The user profile 190 may also include information indicative of the voice characteristics of the first user 101, such as, but not limited to the accent information, tone information, pitch information, speech patterns, languages of the first user 101, or any other information associated with the speech of the first user 101. In addition to noise profiles, device profiles 185, and user profiles 190, the system 100 may also include location profiles 180, which may include audio information, location information, noise cancellation information, or other information specific to a particular location, such as the acoustic environment 108. The location profiles 180 may include real-time location data that can be utilized to adapt the processing of the audio streams based on expected changes in noise scenarios that the first user 101, or any other selected user, experiences.

Once the acoustic environment recognizer 165 compares the obtained metadata, sensor data, other information, and measurements to the metadata and information contained in a noise profile, a device profile 185 associated with the first user device 102, a user profile 190, location profile 180, or to any other information, the acoustic environment recognizer 165 may determine that the obtained metadata, sensor data, other information, and measurements correspond to the metadata and information contained in the profiles. The acoustic environment recognizer 165 may confirm and verify the type of environment associated with the acoustic environment 165 and the noise characteristics associated with the acoustic environment 108. In certain embodiments, the acoustic environment recognizer 165 may confirm the type of environment by utilizing speaker identification information and verification technologies. The acoustic environment recognizer 165 may then select, based on the one or more profiles, an optimal processing scheme for suppressing the ambient noise in the audio stream. The optimal processing scheme may include a noise cancellation algorithm, an echo-cancellation technique, or other noise suppression technique that is specifically tailored to eliminate or reduce the effects of the specific type of ambient noise in the audio stream. If, however, the acoustic environment recognizer 165 determines that the obtained metadata, sensor data, other information, and measurements do not correspond directly to the metadata and information contained in one or more profiles, the acoustic environment recognizer 165 may estimate what the acoustic environment 108 is and select a different processing scheme based on the estimation. For example, the acoustic environment recognizer 165 may select a processing scheme for suppressing different ambient noise that has some correlation to the ambient noise in the audio stream. In such a situation, even if the processing scheme for the different ambient does not correlate completely with the ambient noise in the audio stream, any adaptive filtering performed may start off from a better initial standpoint and have a lesser adaptation time than using a random processing scheme to process the audio stream. Once the desired processing scheme is selected by the acoustic environment recognizer 165, the acoustic environment recognizer 165 may provide the processing scheme, along with any other information associated with the acoustic environment 108, to speech signal enhancer 175 for further processing.

Additionally, the system 100 may include a speech signal enhancer 175, which may be utilized to cancel, suppress, or otherwise reduce the impact of ambient noise or other interfering noises from audio streams so as to enhance communications made by the first user 101, the second user 110, or both. The speech signal enhancer 175 may include a memory 176 that includes instructions, and a processor 177 that executes the instructions from the memory 176 to perform various operations that are performed by the speech signal enhancer 175. The processor 177 may be hardware, software, or a combination thereof. In certain embodiments, the speech signal enhancer 175 may reside within or outside the communications network 135, and may be communicatively linked with any of the devices in the system 100. Also, in certain embodiments, the speech signal enhancer 175 may be configured to receive audio streams directly from any of the devices in the system 100, however, in certain embodiments, the speech signal enhancer 175 may be configured to only receive audio streams after they have been analyzed by the acoustic environment recognizer 165. In certain embodiments, the speech signal enhancer 175 may receive the audio streams from the acoustic environment recognizer 165 after the acoustic environment recognizer 165 has identified what type of acoustic environment 108 the acoustic environment 108 is, and after the acoustic environment recognizer 165 has selected an optimal processing scheme based on the type of the acoustic environment 108.

Once the speech signal enhancer 175 receives an audio stream including a desired audio signal and ambient noise, the speech signal enhancer 175 may utilize the optimal processing scheme, metadata, noise profiles, sensor data, and other information associated with the ambient noise and the desired audio signals to process the audio stream and suppress the ambient noise from the audio stream. In certain embodiments, the speech signal enhancer 175 may be configured to access noise suppression algorithms, echo-cancellation algorithms, and other speech enhancement algorithms, such as via database 155, which enable the speech signal enhancer 175 to suppress any ambient noise present in the audio stream. Once the audio stream is processed by the speech signal enhancer 175 to reduce or eliminate the ambient noise, the speech signal enhancer 175 may transmit the enhanced speech signal to an intended destination. For example, the speech signal enhancer 175 may transmit the enhanced speech signal to second user device 102 so that the second user 110 can experience the enhanced speech signal, the speech signal enhancer 175 may transmit the enhanced speech signal to an automatic speech recognition system for processing, or the speech signal enhancer 175 may transmit the enhanced speech signal to any other intended destination.

Notably, the functionality of the system 100 may be supported and executed by using any combination of the servers 140, 145, and 150 in the communications network 135 or outside of the communications network 135. In one embodiment, the server 140 may include a memory 141 that includes instructions, and a processor 142 that executes the instructions from the memory 141 to perform various operations that are performed by the server 140. Additionally, the server 145 may include a memory 146 that includes instructions, and a processor 147 that executes the instructions from the memory 146 to perform various operations that are performed by the server 145. Furthermore, the server 150 may include a memory 151 that includes instructions, and a processor 152 that executes the instructions from the memory 151 to perform various operations that are performed by the server 150. The processors 142, 147, and 152 may be hardware, software, or a combination thereof. In certain embodiments, the servers 140, 145, and 150 may be network servers, routers, gateways, computers, mobile devices or any other suitable computing device.

The communications network 135 of the system 100 may be configured to link each of the devices in the system 100 to one another, and be configured to transmit, generate, and receive any information and data traversing the system 100. In one embodiment, the communications network 135 may include any number of additional servers in addition to the server 140, the server 145, and the server 150. In certain embodiments, the communications network 135 may include the acoustic environment recognizer 165 and the speech signal enhancer 175, however, in other embodiments, the acoustic environment recognizer 165 and the speech signal enhancer 175 may reside outside the communications network 135. The communications network 135 may also include and be connected to a cloud-computing network, a wireless network, an ethernet network, a satellite network, a broadband network, a cellular network, a private network, a cable network, the Internet, an internet protocol network, a multiprotocol label switching (MPLS) network, a content distribution network, or any combination thereof. In one embodiment, the communications network 135 may be part of a single autonomous system that is located in a particular geographic region, or be part of multiple autonomous systems that span several geographic regions.

The database 155 of the system 100 may be utilized to store and relay information that traverses the system 100, cache content that traverses the system 100, store data about each of the devices in the system 100 and perform any other typical functions of a database. In one embodiment, the database 155 may be connected to or reside within the communications network 135. Additionally, the database 155 may include a processor and memory or be connected to a processor and memory to perform the various operation associated with the database 155. In certain embodiments, the database 155 may be connected to servers 140, 145, and 150, server 160, first user device 102, second user device 111, the acoustic environment recognizer 165, the speech signal enhancer 175, or any combination thereof. The database 155 may also store content and metadata obtained from the acoustic environment 108, store metadata and other information associated with the first and second users 101, 110, store user profiles 190, device profiles 185, location profiles 180, noise profiles, and audio profiles, store location information, store communications, store information about the interferers 114, 125, store user preferences, store noise cancellation and suppression algorithms, store audio enhancement algorithms and techniques, store adapting filtering techniques, store noise cancellation signals, store metadata, content, and information associated with the ambient noise, store metadata associated with desired audio signals, store metadata associated with any device or signal in the system 100, store information relating to patterns of usage relating to the first user device 102 and second user device 111, store any information traversing the system 100, or any combination thereof. Furthermore, the database 155 may be configured to process queries sent to it by any device in the system 100.

Operatively, the system 100 may provide an acoustic environment recognizer 165 that assists in providing optimal speech processing of audio streams. In a first example scenario, the first user 101 of the first user device 102 may have purchased and installed a new television in the first user's 101 living room after disconnecting an old television. Once the first user 101 turns on the television, the first user 101 may be guided, by an intelligent agent application executing on the television, through a voice-guided step-by-step process. The first user 101 may then begin speaking. If the first user 101 has a user profile 190 or other profiles including information, such as voice characteristics or other audio characteristics associated with the first user 101 and the acoustic environment 108, the system 100 will not only be able to recognize the first user 101 based on the first user's 101 voice, but also the acoustic environment 108 of the user, which in this case is a living room.

The acoustic environment recognizer 165 may receive an audio stream including the speech signal of the first user 101, along with any ambient noise that is picked up by a microphone of the television. Based on the audio stream, the acoustic environment recognizer 165 may recognize the first user 101 and the acoustic environment 108 by comparing the ambient noise occurring in the acoustic environment 108, the speech of the first user 101, metadata associated with the speech and the ambient noise, sensor data, or any other information to the information contained in the user profile 190 or any other profile. Once the first user 101 and the acoustic environment 108 are recognized and verified, the acoustic environment recognizer 165 may select an optimal processing scheme for suppressing the ambient noise from the audio stream. The processing scheme may be selected based on not only the user profile 190, but also a device profile 185 for the new television. For example, the device profile 185 may include audio cancellation information or other audio information correlating to the new speakers and microphone of the new television, and this information may also be utilized to select the processing scheme.

Once the processing scheme is selected, the acoustic environment recognizer 165 provide the processing scheme to the speech signal enhancer 175 so that the speech signal enhancer 175 may process the audio stream. The speech signal enhancer 175 may utilize the processing scheme to suppress the ambient noise from the audio stream to create an enhanced audio stream so that only the first users' 101 speech is what is ultimately provided as an input to the voice-guided step-by-step process. In doing so, the voice-guided step-by-step process will be able to process the input without the undesirable effects of the ambient noise. After the enhanced audio stream is transmitted to the voice-guided step-by-step process, the system 100 may include updating the metadata, profiles, and other information in the system 100 based on the audio stream, based on the noise suppression process itself, and based on metadata, sensor data, or other information obtained by the system 100. Notably, all of the operations of the processes described for the system 100 may be performed by utilizing cloud-computing network resources of the communications network 135

In a second example scenario, the first user 101 may have bought a new smartphone, such as first user device 102, at a store. While at the store, the first user 101 may engage in a conversation with an intelligent software application that is utilizing an automatic speech recognition process to assist the first user 101 in transferring her media content and settings to the new smartphone. In this scenario, the intelligent software application, which may be a part of the system 100, may determine that the first user 101 upgraded to the new smartphone, which has a different set of speakers and microphones when compared the first user's 101 old phone. The information for the new smartphone may be contained in a device profile 185 for the new smartphone, and may be utilized in conjunction with a user profile 190 for the first user 101 to optimize the processing of the first user's 101 speech before it is transmitted to the automatic speech recognition process. In certain embodiments, the system 100 may delete a device profile 185 for the first user's 101 old phone now that she is using the new smartphone.

In a third example scenario, the first user 101 may have changed his job, and the first user 101 may be working for a new employer at a new location. In his previous job, the first user 101 may have worked in a cubicle environment that had significant amounts of ambient noise coming from the first user's 101 coworkers and the air conditioning system in environment. Based on the previous job, the first user 101 may have had a user profile 190 or other profile including information relating to the specific audio characteristics in the cubicle environment. In contrast, the first user's 101 new job location may be quiet, with the only ambient noise being the occasional beep from the first users' 101 first user device 102 and the noise generated by the office lights. When the first user 101 moves to the new job location, the system 100 may recognize, such as by utilizing the acoustic environment recognizer 165, the change in environment. The acoustic environment recognizer 165 may automatically load a new profile tailored to the new environment and the system 100 may use the new profile to suppress the ambient noise occurring at the new job location so as to enhance the first user's 101 communications.

In a fourth example scenario, the first user 101 may commute regularly to work, and may always use the same route. However, one day, the first user 101 may be forced to take an alternate route because there is extensive construction on the first user's 101 normal route. For example, the alternate route may require the first user 101 to drive through city streets instead of the usual highway the first user 101 takes. As the first user 101 is driving past the construction on the usual route, the first user 101 may be speaking to his vehicle's navigation and concierge service to determine how long the construction will last and to determine whether the alternate route would be available to bring him to work faster. Since the system 100 knows the first user's 101 location, such as via a global positioning sensor, the first user's 101 dialogue with the navigation and concierge service may be adjusted smoothly, based on one or more profiles, to account for a loud steam-hammer at the construction site. The dialogue may be adjusted in a transparent way that allows for a high-quality experience for the first user 101. This may be the case, for example, even if the first user 101 has his driver-side window open and the navigation and concierge service loses some of the speech inputs when the steam-hammer is operating.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, receiving the audio stream including the audio signal associated with the first user 101 and the ambient noise from the acoustic environment 108 of the user 101, obtaining metadata, sensor data, and other information associated with the ambient noise and audio stream, identifying acoustic parameters based on the metadata, sensor data, and other information, determining if the obtained metadata and sensor data correspond to previously stored metadata in a profile associated with the acoustic environment 108, selecting a processing scheme for suppressing the ambient noise from the audio stream, processing the audio stream using the processing scheme, providing the processed audio stream to an intended destination, and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIGS. 1-2 illustrate specific example configurations of the various components of the system 100, the system 100 may include any configuration of the components, which may include using a greater or lesser number of the components. For example, the system 100 is illustratively shown as including a first user device 102, a second user device 111, a interferer 114, an interfering device 115 a interferer 125, communications network 135, a server 140, a server 145, a server 150, a server 160, a database 155, an acoustic environment recognizer 165, and a speech signal enhancer 175. However, the system 100 may include multiple first user devices 102, multiple second user devices 111, multiple interferers 114, 125, multiple interfering devices 115, multiple communications networks 135, multiple servers 140, 145, 150, and 160, multiple databases 155, multiple acoustic environment recognizers 165, multiple speech signal enhancers 175, or any number of any of the other components in the system 100. Furthermore, in certain embodiments, substantial portions of the functionality and operations of the system 100 may be performed by other networks and systems that may be connected to system 100.

Figure 3:
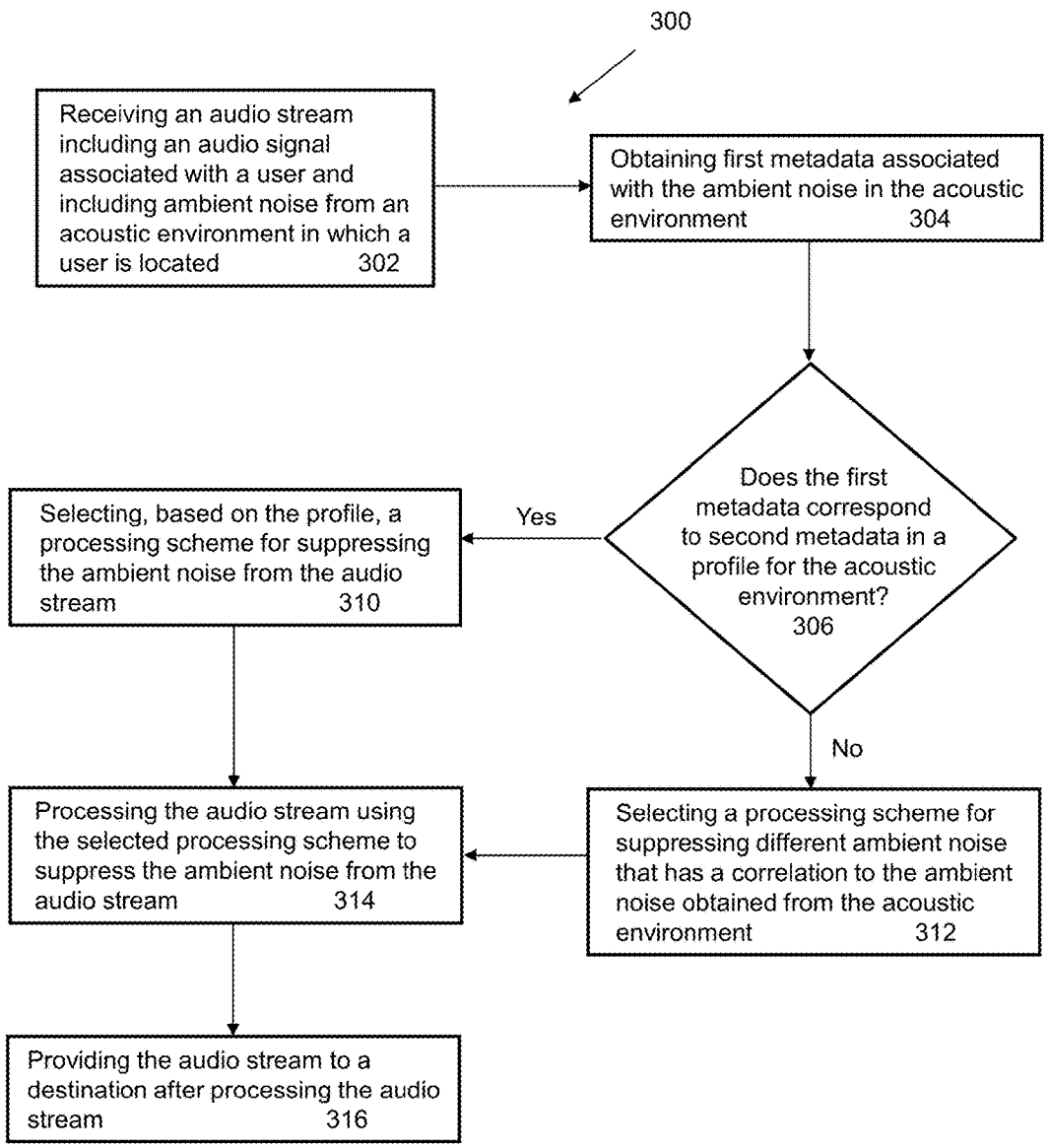
FIG. 3 is a flow diagram illustrating a sample method for providing an acoustic environment recognizer for optimal speech processing according to an embodiment of the present disclosure.

As shown in FIG. 3, an exemplary method 300 for providing an acoustic environment recognizer 165 for optimal speech processing is schematically illustrated, and may include, at step 302, receiving an audio stream including a desired audio signal associated with a user, such as first user 101. The audio stream may also include ambient noise from an acoustic environment 108 in which the user is located in. For example, the desired audio signal may be a voice communication, a media communication, or any other type of audio communication received from first user 101 via the first user device 102. The ambient noise may be noise in the acoustic environment 108 that is picked up by a microphone of the first user device 102 when the first user 101 generated the desired audio signal. The desired audio signal may be intended to be sent to the second user device 111 of the second user 110, to an automatic speech recognition system, to any other desired destination, or any combination thereof. In certain embodiments, the receiving of the audio stream may be performed by the acoustic environment recognizer 165, the speech signal enhancer 175, the servers 140, 145, 150, 160, the databases 155, any combination thereof, or by any other appropriate device. Once the audio stream is received, the method 300 may include, at step 304, obtaining metadata, sensor data, information, and measurements associated with the ambient noise in the acoustic environment 108. In certain embodiments, the metadata, the sensor data, the information and the measurements may be obtained by utilizing the acoustic environment recognizer 165, the servers 140, 145, 150, 160, the first user device 102, the second user device 111, the database 155, the camera 105, the accelerometer 106, the gyroscope 109, the global positioning sensor 107, any combination thereof, or by any other appropriate device.

Once the metadata, the sensor data, the information, measurements, or any combination thereof are obtained, the method 300 may include, at step 306, determining if the metadata, sensor data, information, and measurements correspond to metadata and information stored in a profile for the acoustic environment 108. In certain embodiments, the determining may be performed by the acoustic environment recognizer 165, the servers 140, 145, 150, 160, the first user device 102, any combination thereof, of by any other appropriate device. If the obtained metadata, sensor data, information, or measurements correspond to the metadata and information in the profile, the method 300 may include, at step 310, selecting, based on the profile, a processing scheme specifically tailored to suppress the ambient noise from the audio stream. The processing scheme may also be selected based on the location that the ambient noise occurred in, the type of device of the first user device 102, a user profile 190 associated with the first user 101, or any combination thereof. In certain embodiments, the selecting of the processing scheme may be performed by the acoustic environment recognizer 165, the servers 140, 145, 150, 160, the first user device 102, any combination thereof, of by any other appropriate device. Once the processing scheme is selected, the method 300 may include proceeding to step 314. At step 314, the method 300 may include processing the audio stream using the selected processing scheme to suppress the ambient noise from the audio stream to create an enhanced audio stream. In certain embodiments, the processing of the audio stream may be performed by the speech signal enhancer 175, the servers 140, 145, 150, 160, the first user device 102, any combination thereof, or by any other appropriate device.

If, however, the obtained metadata, sensor data, information, or measurements do not correspond to the metadata and information in the profile, the method 300 may include, at step 312, selecting a processing scheme for suppressing different ambient noise that has at least a correlation with the ambient noise obtained from the acoustic environment 108. By selecting a processing scheme for the different ambient noise that has a correlation with the ambient noise obtained from the acoustic environment 108, the method 300 may be utilized to assist in suppressing at least some portion of the ambient noise from the audio stream based on the correlation. In certain embodiments, the selecting of the processing scheme for suppressing the different ambient noise may be performed by the acoustic environment recognizer 165, the servers 140, 145, 150, 160, the first user device 102, any combination thereof, of by any other appropriate device. Once the processing scheme is selected, the method 300 may include proceeding to step 314 and processing the audio stream using the selected processing scheme for suppressing the different ambient noise so as to generate an enhanced audio stream. In certain embodiments, the processing of the audio stream may be performed by the speech signal enhancer 175, the servers 140, 145, 150, 160, the first user device 102, any combination thereof, or by any other appropriate device.

Once step 314 is completed, the method 300 may include, at step 316, providing the enhanced audio stream to destination. For example, the enhanced audio stream may be provided to the second user device 111 of the second user 110 so that the second user 110 may experience the enhanced audio stream, the enhanced audio stream may be provided to an automatic speech recognition process for further processing, or the audio stream may be provided to any other destination. It is important to note that the methods described above may incorporate any of the functionality, devices, and/or features of the system 100 and subsystems described above, or otherwise, and are not intended to be limited to the description or examples provided herein.

Notably, the system 100 and methods disclosed herein may include additional functionality and features. In certain embodiments, visual, audio, and other information may be obtained by utilizing any type of sensor, such as, but not limited to, any visual sensor, any acoustic sensor, any recording device, any light sensor, any other type of sensor, or a combination thereof. Additionally, information and metadata may be obtained by using visual information captured by the camera 105, acceleration data captured by the accelerometer 106, orientation data captured using the gyroscope 109, and location data captured by the global positioning sensor 107. Information and metadata obtained from sensors may be utilized to identify or refine, locally or in concert with cloud-based network resources, acoustic parameters that may be useful in subsequent processing of the audio streams. For example, the orientation of the first user device 102 may be obtained from metadata obtained from the accelerometer 106, and this information may assist in subsequent processing of audio streams associated with the first user device 102.

In additional embodiments, the system 100 and methods may include storing any of the profiles in the communications network 135, which may be cloud-computing network. The profiles may be associated by user, by vehicle, of by any other type of association. For example, a device profile 185 may be a profile for a Ford F150 with a Hemi V8 that indicates that a user is typically in the driver's seat of the F150. While this device profile 185 may be utilized for other users, a profile for a home for a given user may be unique to a given user.

Figure 4:
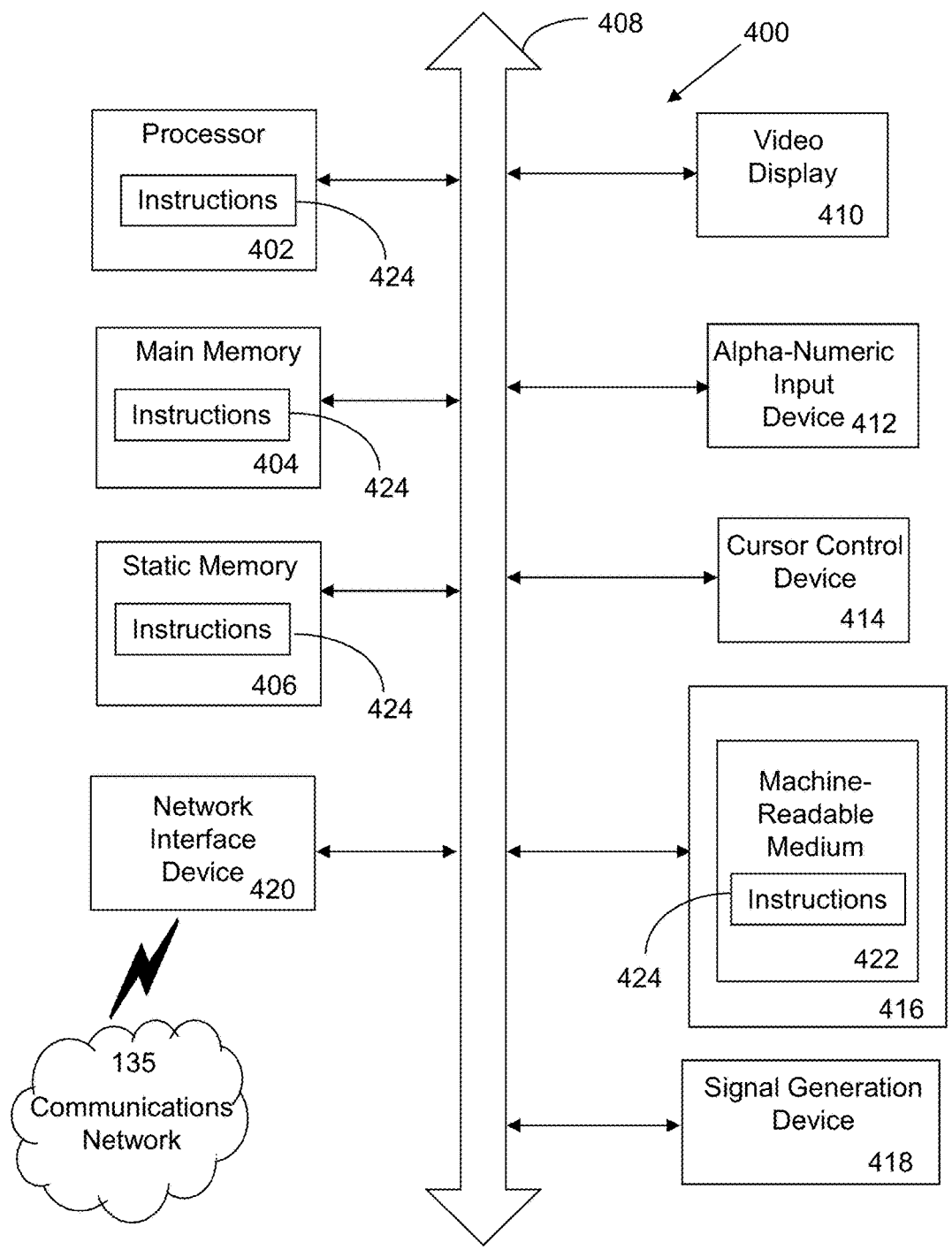
FIG. 4 is a schematic diagram of a machine in the form of a computer system within which a set of instructions, when executed, may cause the machine to perform any one or more of the methodologies or operations of the systems and methods for providing an acoustic environment recognizer for optimal speech processing.

Referring now also to FIG. 4, at least a portion of the methodologies and techniques described with respect to the exemplary embodiments of the system 100 can incorporate a machine, such as, but not limited to, computer system 400, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 135, another network, or a combination thereof) to and assist with operations performed by other machines and systems, such as, but not limited to, the first user device 102, the second user device 111, the server 140, the server 145, the server 150, the database 155, the server 160, the acoustic environment recognizer 165, the speech signal enhancer 175, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410, which may be, but is not limited to, a liquid crystal display (LCD), a flat panel, a solid state display, or a cathode ray tube (CRT). The computer system 400 may include an input device 412, such as, but not limited to, a keyboard, a cursor control device 414, such as, but not limited to, a mouse, a disk drive unit 416, a signal generation device 418, such as, but not limited to, a speaker or remote control, and a network interface device 420.

The disk drive unit 416 may include a machine-readable medium 422 on which is stored one or more sets of instructions 424, such as, but not limited to, software embodying any one or more of the methodologies or functions described herein, including those methods illustrated above. The instructions 424 may also reside, completely or at least partially, within the main memory 404, the static memory 406, or within the processor 402, or a combination thereof, during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 422 containing instructions 424 so that a device connected to the communications network 135, other network, or a combination thereof, can send or receive voice, video or data, and to communicate over the communications network 135, other network, or a combination thereof, using the instructions. The instructions 424 may further be transmitted or received over the communications network 135, other network, or a combination thereof, via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device, or "computer-readable device" shall accordingly be taken to include, but not be limited to: memory devices, solid-state memories such as a memory card or other package that houses one or more read-only (nonvolatile) memories, random access memories, or other rewritable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system, comprising:
    a first memory that stores a first set of instructions;
    a first hardware processor of an acoustic environment recognizer that executes the first set of instructions to perform a first set of operations, the first set of operations comprising:
        obtaining, from visual content captured by a camera of a device of a user, first metadata associated with ambient noise occurring in an acoustic environment in which the user is located;
        determining if the first metadata associated with the ambient noise corresponds to second metadata in a profile for the acoustic environment;
        selecting, based on the first metadata and the visual content, and if the first metadata associated with the ambient noise corresponds to the second metadata in the profile for the acoustic environment, a first processing scheme, wherein the first processing scheme suppresses the ambient noise from an audio stream including an audio signal associated with the user;
        selecting, if the first metadata associated with the ambient noise does not correspond to the second metadata in the profile for the acoustic environment, a second processing scheme, wherein the second processing scheme suppresses different ambient noise that has a correlation to the ambient noise occurring in the acoustic environment;
    a second memory that stores a second set of instructions; and
    a second hardware processor of a speech signal enhancer that executes the second set of instructions to perform a second set of operations, the second set of operations comprising:
        processing the audio stream using the first processing scheme in order to suppress the ambient noise in the audio stream interfering with the audio signal associated with the user, thereby enhancing the audio stream; and
        providing, after processing the audio stream using the first processing scheme, the audio stream to a destination.

2. The system of claim 1, wherein the first set of operations further comprises receiving, at the first hardware processor of the acoustic environment recognizer, the audio stream including the audio signal associated with the user.

3. The system of claim 1, wherein the first set of operations further comprises obtaining orientation data from a sensor of the device of the user.

4. The system of claim 3, wherein the first set of operations further comprises selecting the first processing scheme based on the orientation data.

5. The system of claim 1, wherein the first set of operations further comprises obtaining, from acoustic data obtained from an acoustic sensor of the device, third metadata associated with the ambient noise.

6. The system of claim 1, wherein the first set of operations further comprises selecting the first processing scheme based on a device type of the device.

7. The system of claim 1, wherein the first set of operations further comprises selecting the first processing scheme based on a location corresponding to the acoustic environment.

8. The system of claim 1, wherein the first set of operations further comprises identifying a type of the acoustic environment based on the first metadata.

9. The system of claim 8, wherein the first set of operations further comprise selecting the first processing scheme based on the type of the acoustic environment.

10. The system of claim 1, wherein the second set of operations further comprise enhancing the audio stream by utilizing a device profile associated with the device of the user.

11. The system of claim 1, wherein the second set of operations further comprise enhancing the audio stream by utilizing a user profile associated with the user.

12. The system of claim 1, wherein the first set of operations further comprise determining a voice characteristic of the user.

13. A method, comprising:
    extracting, from visual content captured by a camera of a device of a user, first metadata associated with ambient noise occurring in an acoustic environment in which the user is located, wherein the extracting is performed by utilizing instructions from a first memory that are executed by a first hardware processor of an acoustic environment recognizer;

determining if the first metadata associated with the ambient noise corresponds to second metadata in a profile for the acoustic environment;

selecting, based on the first metadata and the visual content and if the first metadata associated with the ambient noise corresponds to the second metadata in the profile for the acoustic environment, a first processing scheme, wherein the first processing scheme suppresses the ambient noise from an audio stream including an audio signal associated with the user;

selecting, if the first metadata associated with the ambient noise does not correspond to the second metadata in the profile for the acoustic environment, a second processing scheme, wherein the second processing scheme suppresses different ambient noise that has a correlation to the ambient noise occurring in the acoustic environment;

processing, by utilizing instructions from a second memory that are executed by a second hardware processor of a speech signal enhancer, the audio stream using the first processing scheme in order to suppress the ambient noise in the audio stream interfering with the audio signal associated with the user, thereby enhancing the audio stream; and transmitting, after processing the audio stream using the first processing scheme, the audio stream to a destination.

14. The method of claim 13, further comprising receiving, at the first hardware processor of the acoustic environment recognizer, the audio stream including the audio signal associated with the user.

15. The method of claim 13, further comprising obtaining orientation data from a sensor of the device of the user.

16. The method of claim 13, further comprising generating a new profile for the acoustic environment.

17. The method of claim 13, further comprising enhancing the audio stream based on a time at which the audio stream is received.

18. The method of claim 13, further comprising identifying a type of the acoustic environment based on the first metadata.

19. The method of claim 18, further comprising selecting the first processing scheme based on the type of the acoustic environment.

20. A computer-readable device comprising a first set of instructions, which when executed by a first hardware processor of an acoustic environment recognizer, cause the first hardware processor to perform a first set of operations comprising:

obtaining, from visual content captured by a camera of a device of a user, first metadata associated with ambient noise occurring in an acoustic environment in which the user is located;

determining if the first metadata associated with the ambient noise corresponds to second metadata in a profile for the acoustic environment;

selecting, based on the first metadata and the visual content and if the first metadata associated with the ambient noise corresponds to the second metadata in the profile for the acoustic environment, a first processing scheme, wherein the first processing scheme suppresses the ambient noise from an audio stream including an audio signal associated with the user;

selecting, if the first metadata associated with the ambient noise does not correspond to the second metadata in the profile for the acoustic environment, a second processing scheme, wherein the second processing scheme suppresses different ambient noise that has a correlation to the ambient noise occurring in the acoustic environment;

wherein the computer-readable device comprises a second set of instructions, which when executed by a second hardware processor of a speech signal enhancer, cause the second hardware processor to perform a second set of operations comprising:

processing the audio stream using the processing scheme in order to suppress the ambient noise in the audio stream interfering with the audio signal associated with the user, thereby enhancing the audio stream; and transmitting, after processing the audio stream using the processing scheme, the audio stream to a destination.

* * * * *